United States Patent [19]

Masuda

[11] Patent Number: 4,499,205
[45] Date of Patent: Feb. 12, 1985

[54] HIGH ACTIVITY CATALYST FOR REFORMING OF METHANOL AND PROCESS OF PREPARING SAME

[75] Inventor: Koji Masuda, Yokosuka, Japan

[73] Assignee: Nissan Motor Company, Limited, Yokohama, Japan

[21] Appl. No.: 482,533

[22] Filed: Apr. 6, 1983

[30] Foreign Application Priority Data

Apr. 12, 1982 [JP] Japan .................. 57-60512

[51] Int. Cl.$^3$ .................. B01J 23/10; B01J 23/40
[52] U.S. Cl. .................. 502/303; 502/302; 502/304; 502/332; 502/333; 502/334; 252/373
[58] Field of Search ............... 502/302, 303, 304, 332, 502/333, 334; 252/373; 423/415 A

[56] References Cited

U.S. PATENT DOCUMENTS

| 4,076,792 | 2/1978 | Foster et al. | 502/333 |
| 4,369,132 | 1/1983 | Kinoshita et al. | 502/302 X |
| 4,426,319 | 1/1984 | Blanchard et al. | 502/304 X |

FOREIGN PATENT DOCUMENTS

| 56-48252 | 5/1981 | Japan . |
| 56-147633 | 11/1981 | Japan . |
| 57-7254 | 2/1982 | Japan . |
| 57-7255 | 2/1982 | Japan . |

*Primary Examiner*—W. J. Shine
*Attorney, Agent, or Firm*—Schwartz, Jeffery, Schwaab, Mack, Blumenthal & Koch

[57] ABSTRACT

A catalyst for reforming of methanol to hydrogen and carbon monoxide, which is high in activity, selectivity and durability. The catalyst comprises a granular or monolithic carrier which is made of active alumina at least in its surface regions, at least one metal oxide selected from oxides of the rare earth metals such as Ce, La, Pr, Nd and Y or from oxides of the titanium family metals such as Ti and Zr deposited on the carrier and at least one catalytic metal of the platinum group such as Pt, Rh and/or Pd, which is deposited on the carrier by pyrolysis of suitable compound of each catalytic metal applied to the carrier as a solution and rendered substantially completely reduced by a subsequent treatment with a solution of a reducing agent such as sodium boron hydride or hydrazine. The metal oxide(s) can be deposited on the carrier by pyrolysis of a suitable salt of the selected metal initially applied to the carrier as a solution.

11 Claims, 3 Drawing Figures

HIGH ACTIVITY CATALYST FOR REFORMING OF METHANOL AND PROCESS OF PREPARING SAME

BACKGROUND OF THE INVENTION

This invention relates to an improved catalyst for reforming of methanol to hydrogen and carbon monoxide and a process of preparing the same.

In conventional catalysts for reforming of methanol to hydrogen and carbon monoxide, active alumina or a silica base inorganic oxide is usually used as the material of the catalyst support or carrier. As the catalytic substance to be deposited on the carrier, it is usual to employ a metal or metals of the platinum group such as platinum, palladium, rhodium and/or ruthenium, or a base metal or base metals, such as chromium, manganese, iron, cobalt, nickel, copper and/or zinc or oxide(s) thereof. In such conventional catalysts, generally the noble metals have been accepted as superior to the base metals in terms of both conversion efficiency or catalytic activity on the decomposition of methanol to hydrogen and carbon monoxide and durability of the catalyst exposed to vaporized methanol in heated state, and platinum, rhodium and palladium have been taken as particularly advantageous.

From a practical point of view, however, the conventional catalysts are still unsatisfactory in their activity, durability and selectivity for the intended decomposition reaction of methanol to hydrogen and carbon monoxide even when metals of the platinum group are used as the catalytic material. Therefore, there is a trend of depositing a considerably large amount of noble metal on the carrier in producing conventional catalysts of the above described type with a view to improving the activity and durability of the catalysts, particularly the activity at relatively low temperatures and durability under practical reforming conditions including the adaptability to the reforming processes in which vaporized methanol is passed through a catalyst column or bed at a relatively high space velocity. However, such compensative measures are of limited effect and inevitably lead to a considerable rise in the cost of the catalysts, which offers a serious problem to the reforming of methanol on the commercial basis.

SUMMARY OF THE INVENTION

It is an object of the present invention to provide an improved catalyst for reforming of methanol to hydrogen and carbon monoxide, which catalyst contains a relatively small amount of noble metal but is sufficiently high in its activity and selectivity for the intended reforming reaction even at relatively low temperatures and is high also in durability even when used under relatively severe reaction conditions.

It is another object of the invention to provide a process of preparing a catalyst according to the invention.

A catalyst according to the invention comprises a support or carrier which may be either granular or monolithic and in any case is made of active alumina at least in substantially the entire surface region thereof, at least one metal oxide which is an oxide of a metal selected from the rare earth metals or from the titanium family metals and at least one catalytic metal of the platinum group, both the metal oxide(s) and the catalytic metal(s) being deposited and distributed on the carrier. Each catalytic metal in this catalyst is formed by pyrolysis of a compound of the catalytic metal on the carrier and is in substantially completely reduced state. More specifically, each catalytic metal deposited on the carrier by the pyrolysis is rendered substantially completely reduced by a subsequent treatment with a solution of a reducing agent.

Preferably the total amount of the metal(s) of the metal oxide(s) in the catalyst is in the range from 0.1 to 10% by weight of the carrier, and also preferably the total content of the catalytic metal(s) of the platinum group in the catalyst is in the range from 0.1 to 1.0% by weight. Preferred examples of the metal used in the form of oxide are Ce, La, Pr, Nd and Y among the rare earth metals and Ti and Zr among the titanium family metals.

My process of preparing a catalyst according to the invention comprises the following steps, assuming for simplicity that only one catalytic metal of the platinum group is deposited on the catalyst. (A) First at least one metal oxide of the above described category is deposited on the carrier. (B) Next the carrier carrying thereon the metal oxide(s) is impregnated with an aqueous solution of a thermally decomposable compound of a catalytic metal of the platinum group. (C) After adequate drying the carrier impregnated with the solution is baked to decompose the catalytic metal compound adhering to the carrier to thereby deposit the catalytic metal on the carrier. (D) The carrier after the baking step (C) is immersed in and treated with a solution of a reducing agent so that the catalytic metal deposited on the carrier is substantially completely reduced.

Preferably the initial deposition of the metal oxide on the carrier is performed by first impregnating the carrier with an aqueous solution of a suitable salt of the metal selected from the rare earth metals or from the titanium family metals and then baking the carrier impregnated with the solution so as to form oxide of the metal by pyrolysis of the metal salt. Where the deposition of two kinds of metals is desired, a salt of another selected metal is additionally dissolved in the solution with which the carrier is first impregnated. To prepare a catalyst containing two kinds of catalytic metals of the platinum group, the solution in the above described step (B) is prepared as a mixed solution of thermally decomposable compounds of the respective metals of the platinum group.

The treatment of the carrier after the baking step for the deposition of catalytic metal(s) of the platinum group, i.e. nearly completed catalyst, with a solution of a reducing agent results in that each catalytic metal of the platinum group already deposited on the carrier undergoes substantially complete reduction and becomes very pure and fine in its crystalline particles. Sodium boron hydride is a preferred example of the reducing agent for this treatment, but it is also possible to select an alternative from various reducing agents including organic ones typified by hydrazine.

A catalyst according to the invention is remarkably high in its activity and selectivity for the decomposition reaction of methanol to hydrogen and carbon monoxide even at relatively low temperatures and exhibits very high durability under practical reforming reaction conditions.

DESCRIPTION OF THE PREFERRED EMBODIMENTS

Figure 1:
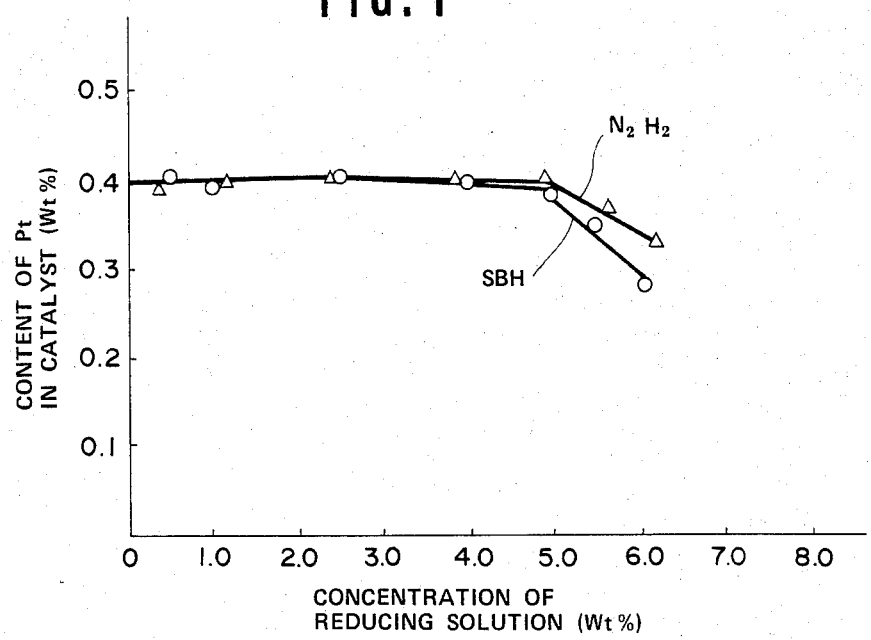
FIG. 1 is a graph showing the influence of the concentration of the reducing agent in the solution used for the reduction treatment of a nearly completed catalyst in the process according to the invention on the content of catalytic metal in the treated catalyst.

In the present invention it is usual to use a catalyst support or carrier in the form of granules or pellets, but it is also possible to use a monolithic carrier having a porous or honeycomb structure. The carrier can be selected from conventional ones, but it is a requirement that the carrier be made of active alumina, which is typified by gamma alumina, either in its entirety or at least in its surface regions where the catalytic substances are to be deposited. That is, the core portion of the carrier is not necessarily made of active alumina but may be made of a different inorganic oxide. For example, coating of the surfaces of a monolythic honeycomb body of cordierite with active alumina gives a carrier useful in this invention. However, it is preferred to use a granular catalyst carrier which consists essentially of active alumina.

As to the metal oxide deposited on the carrier at the first step of the process according to the invention, preferred examples of the metal are cerium, lanthanum, praeseodymium, neodymium and yttrium among the rare earth elements, and titanium and zirconium among the titanium family elements. If desired the catalyst may contain oxides of two or more kinds of such metals.

As to the total amount of the metal oxide(s) in the catalyst, it is preferable that the total content of the metal(s) of the rare earth elements and/or titanium family elements in the catalyst falls in the range from 0.1 to 10% by weight of the carrier. When the total content of the metal oxide(s) is less than 0.1% by weight the expected effect of the metal(s) is hardly appreciable in practice, but when the content of the metal(s) exceeds 10% by weight the catalyst tends to become lower in its performance and particularly in its activity at relatively low temperatures.

A desired oxide of a rare earth metal or a titanium family metal can be formed on the carrier surface by thermal decomposition of a suitable salt of the metal. In a practical process, first the carrier is immersed in an aqueous solution of a suitable salt such as nitrate or sulfate of the selected metal so as to be well impregnated with the solution. Where it is intended to prepare a catalyst containing two kinds of metal oxides, use is made of a mixed solution prepared by dissolving salts of the respective metals.

The carrier impregnated with the metal salt solution is dried to reduce the moisture content to a suitable level and then baked in an air stream usually at a temperature in the range from about 450° C. to about 600° C. preferably for 1 to 3 hr.

After the deposition of the desired metal oxide, at least one of the platinum group metals that are known as high in catalytic activity is deposited on the carrier by thermal decomposition of a suitable compound of the selected metal. It is preferred to make a selection from platinum, palladium and rhodium. Also it is preferred that the total content of the platinum group metal(s) in the catalyst is in the range from 0.1 to 1.0% by weight. When the total content of the metal(s) of platinum group is less than 0.1% by weight the activity of the catalyst remains insufficient for efficient reforming of methanol. However, it is uneconominal to increase the content of the platinum group metal(s) beyond 1% by weight, and loss of the platinum group metal(s) during preparation of the catalyst becomes significant when it is intended to deposit more than 1% by weight of the metal(s) on the carrier.

For the deposition of a metal of the platinum group, the carrier already comprising the above described metal oxide is first immersed in an aqueous solution of a thermally decomposable compound of the selected metal so as to be well impregnated with the solution. In the case of preparing a catalyst that contains two kinds of platinum group metals, use is made of a mixed solution prepared by dissolving suitable compounds of the respective metals. Typical examples of platinum group metal compounds useful for this purpose are chloroplatinic acid, palladium chloride and rhodium chloride. It is optional and rather preferable to add ammonium thiosulfate to the platinum group metal compound solution to thereby impregnate the carrier with a sulfurized complex compound.

The carrier impregnated with the platinum group metal compound solution is dried to reduce the moisture content to a suitable level and then baked usually at a temperature in the range from about 500° C. to about 600° C. for about 1-3 hr. It is preferred to carry out the baking in a steam atmosphere, but it is also possible to perform the baking either in air or in hydrogen gas.

As an important feature of the invention, a nearly completed catalyst obtained by the above described procedure is subjected to a liquid phase reduction treatment, i.e. treatment with an aqueous solution of a suitable reducing agent. For this treatment an almost free selection can be made from various reducing agents such as sodium hydrogen hydride, sodium sulfide, ammonium sulfide, hydrazine, formaldehyde, pyrogallol, hydroquinone, formic acid and oxalic acid. Among inorganic reducing agents the most preferred is sodium boron hydride (hereinafter abbreviated to SBH), and hydrazine is most suitable among organic reducing agents.

The liquid phase reduction treatment is accomplished simply by immersing the nearly completed catalyst after the baking process for the deposition of the platinum group metal(s) in a solution of a selected reducing agent and keeping the catalyst in the solution for several minutes with adequate stirring. After this treatment the catalyst is washed with water and dried. Preferably the concentration of the reducing agent in the solution is at least 0.01% by weight in the case of SBH and at least 0.1% by weight in the case of hydrazine with a view to affording a sufficient reducing power to the solution. However, it is preferred that the concentration of the reducing agent in the solution does not exceed 5.0% by weight whether the reducing agent is SBH or hydrazine because the use of a more concentrated solution is liable to cause loss of a portion of the catalytic metal deposited on the catalyst during the reduction treatment. In this regard, FIG. 1 shows the result of an experiment carried out on a catalyst prepared by deposition of 0.40% by weight of platinum on a granular carrier. As can be seen in FIG. 1, when the concentration of the reducing agent, either SBH or hydrazine, in the solution for the reduction treatment was above 5% by weight there occurred an appreciable decrease in the content of platinum in the treated catalyst, and the reason for this phenomenon must be dissolution of a portion of the platinum from the catalyst into the reducing solution.

The invention will further be illustrated by the following nonlimitative examples.

EXAMPLE 1

In this example, and also in the succeeding examples, use was made of a granular catalyst carrier which was produced by Rhone-Poulenc S.A. of France and consisted of about 3 mm diameter grains of active alumina ($\gamma$-alumina). This granular carrier had a bulk density of 820 g/liter.

First, 1 liter (820 g) of the alumina grains were immersed in a solution prepared by dissolving 21.0 g of cerium nitrate $Ce(NO_3)_2.6H_2O$ in 250 ml of water purified by ion exchange. The alumina grains impregnated with the cerium nitrate solution were drained and then dried in a hot air oven at 200° C. until the moisture content became below 10% by weight. The thus treated alumina grains were baked in an air stream at 600° C. to cause the nitrate adhereing to the alumina grains to decompose and to turn into cerium oxide $CeO_2$. By analysis it was confirmed that the content of Ce (existing as $CeO_2$) in the baked alumina grains was 1.0% by weight.

At the next step, a solution was prepared by dissolving 8.71 g of chloroplatinic acid $H_2PtCl_6.6H_2O$ in 2.8 liters of water purified by ion exchange. This solution was heated to about 45° C., and 2.74 g of ammonium thiosulfate $(NH_4)_2S_2O_3$ was added to the heated solution such that the mole ratio of platinum to sulfur in the solution became 1:2. The resultant mixed solution was kept heated for several minutes to cause reaction between the solutes. Then 1 liter of the active alumina grains having cerium oxide deposited thereon were impregnated with the sulfurized platinum compound solution by keeping the alumina grains immersed in the solution with adequate stirring. The wet grains were drained and then dried in a hot air oven at 200° C. until the moisture content became below 10% by weight. To accomplish uniform drying, the alumina grains were kept moving in the oven. The thus treated alumina grains were baked in a steam stream at 550° C. for 90 min to cause decomposition of the sulfurized platinum compound to metallic platinum.

After the baking process the alumina grains carrying thereon cerium oxide and platinum were kept immersed in 0.1 Wt% aqueous solution of SBH for 3 min at room temperature. After this treatment the alumina grains were washed with water and dried to complete the process of preparing a catalyst according to the invention.

In the catalyst thus prepared in this example, the content of cerium oxide was such that Ce amounted to 1% by weight of the carrier, and the content of Pt was 0.4% by weight.

EVALUATION TEST

The activity or conversion efficiency of every catalyst prepared in the herein described examples in the reforming of vaporized methanol to hydrogen and carbon monoxide and the endurance of the catalyst were evaluated by the following test.

In every case, a catalyst bed produced by using 20 ml of the catalyst for testing was initially maintained at 300° C., and vaporized methanol (industrial 100% methanol) was passed through the catalyst bed at a volume hourly space velocity of 2000 $hr^{-1}$. Soon the concentration of $H_2$ in the gas stream sampled at a section immediately downstream of the catalyst bed was measured by gas chromatography as an indication of the activity of the catalyst in fresh state. Then the temperature of the catalyst bed was raised to 400° C., and the vaporized methanol was continuously passed through the heated catalyst bed at the space velocity of 2000 $hr^{-1}$ for 200 hr. After that the temperature of the catalyst bed was lowered to 300° C., and the passing of vaporized methanol through the catalyst bed was continued to measure the concentration of $H_2$ in the gas again at the aforementioned section. The endurance of the tested catalyst was evaluated by a comparison between the $H_2$ concentration value obtained at the initial stage of the test and the $H_2$ concentration value obtained after the use of the catalyst bed at 400° C. for 200 hr.

The result of the evaluation test on the catalyst of Example 1 will be given hereinafter in table form together with the results of the same test on some different catalysts which are described below.

REFERENCE 1

A catalyst was prepared by depositing platinum on the granular carrier described in Example 1 by performing the impregnation of the carrier with the sulfurized platinum compound solution and the subsequent baking of the treated carrier in the same manner as in Example 1, but without preceded by the deposition of cerium oxide and without followed by the treatment with SBH solution.

This catalyst contained 0.40% by weight of Pt.

EXAMPLE 2

The process of Example 1 was repeated generally similarly but modified in the following respects.

In this example, platinum and palladium were deposited on the alumina grains carrying thereon cerium oxide by jointly using 8.28 g of chloroplatinic acid and 0.26 g of palladium chloride $PdCl_2$ in place of 8.71 g of chloroplatinic acid in Example 1. The addition of ammonium thiosulfate to the solution of the platinum and palladium compounds, immersion of the alumina grains in the sulfurized solution and baking of the alumina grains impregnated with the solution were carried out in the same manner as in Example 1.

In this example the reduction treatment as the last step of the catalyst preparation process was performed by using 0.5 Wt% aqueous solution of hydrazine instead of the SBH solution in Example 1.

The catalyst prepared in Example 2 contained 1% by weight of Ce (existing as oxide), 0.37% by weight of Pt and 0.03% by weight of Pd.

REFERENCE 2

A catalyst was prepared by performing the process of Example 2 till the baking step for the deposition of platinum and palladium and omitting the reduction treatment in the hydrazine solution. This catalyst contained 1% by weight of Ce, 0.37% by weight of Pt and 0.03% by weight of Pd.

EXAMPLE 3

The process of Example 2 was repeated generally similarly except that 21.3 g of lanthanum nitrate La(-

$NO_3)_2.6H_2O$ was used in place of 21.0 g of cerium nitrate in Example 2, that the quantities of chloroplatinic acid and palladium chloride were slightly decreased and increased, respectively, and that the reduction treatment was performed by using 0.1 Wt% aqueous solution of SBH instead of the hydrazine solution in Example 2.

The catalyst of Example 3 contained such an amount of lanthanum oxide $La_2O_3$ that La amounted to 1% by weight of the carrier, 0.36% by weight of Pt and 0.04% by weight of Pd.

REFERENCE 3

A catalyst was prepared by performing the process of Example 3 till the baking step for the deposition of platinum and palladium and omitting the reduction treatment in the SBH solution. This catalyst contained 1% by weight of La (existing as oxide), 0.36% by weight of Pt and 0.04% by weight of Pd.

EXAMPLE 4

A catalyst was prepared generally in accordance with Example 3 except that the 0.5% hydrazine solution mentioned in Example 2 was used in the reduction treatment in place of the SBH solution in Example 3. This catalyst contained 1% by weight of La, 0.36% by weight of Pt and 0.04% by weight of Pd.

Table 1 shows the results of the above described evaluation test on the catalysts of Examples 1-4 and References 1-3.

TABLE 1

| Catalyst | Deposited Metal Oxide | Catalytic Metal (Wt %) | Reducing Agent | Concentration of $H_2$ in Sampled Gas (%) | |
|---|---|---|---|---|---|
| | | | | initially | after 200 hr |
| Ex. 1 | $CeO_2$ | Pt 0.40 | SBH | 56 | 52 |
| Ref. 1 | — | Pt 0.40 | — | 44 | 37 |
| Ex. 2 | $CeO_2$ | Pt 0.37 Pd 0.03 | $N_2H_4$ | 55 | 51 |
| Ref. 2 | $CeO_2$ | Pt 0.37 Pd 0.03 | — | 53 | 50 |
| Ex. 3 | $La_2O_3$ | Pt 0.36 Pd 0.04 | SBH | 54 | 52 |
| Ref. 3 | $La_2O_3$ | Pt 0.36 Pd 0.04 | — | 51 | 48 |
| Ex. 4 | $La_2O_3$ | Pt 0.36 Pd 0.04 | $N_2H_4$ | 54 | 51 |

Figure 2:
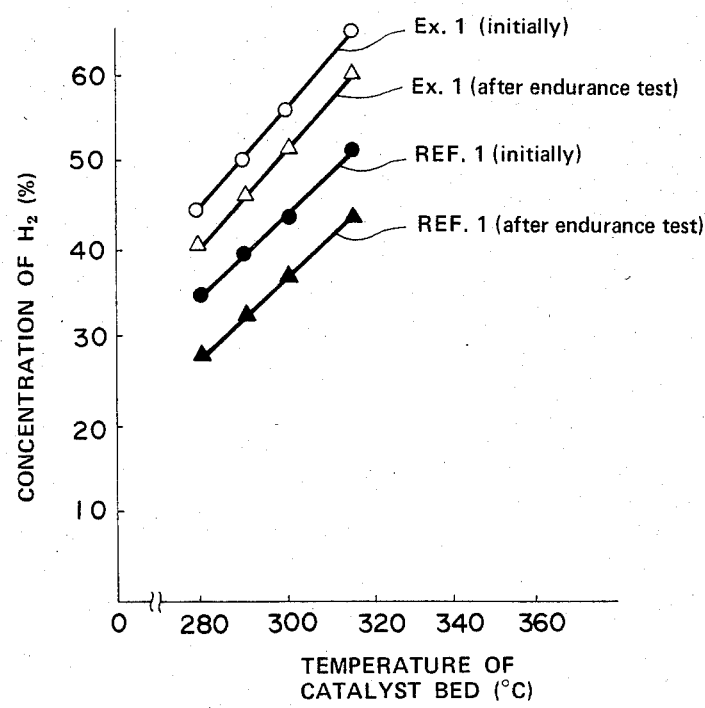
FIG. 2 is a graph showing the results of an evaluation test on a catalyst as an embodiment of the invention and a conventional catalyst.
Figure 3:
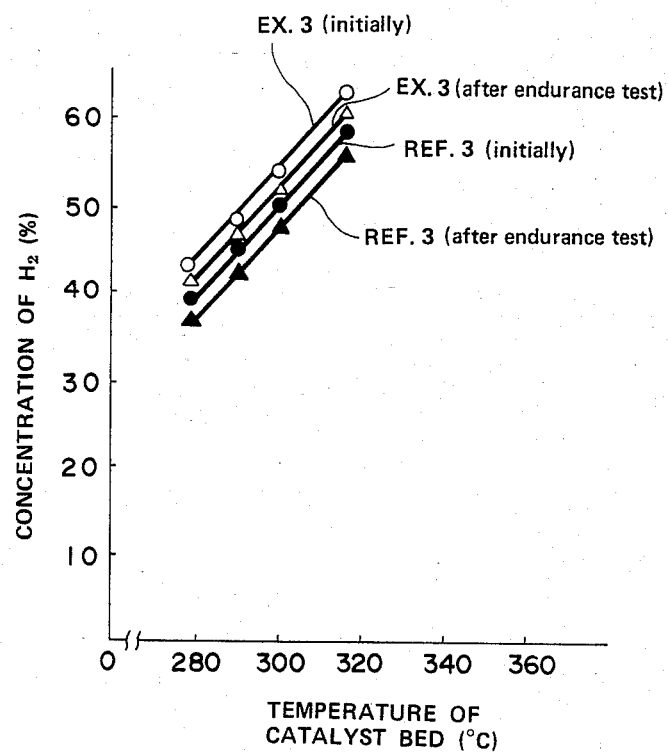
FIG. 3 is a graph showing the results of the same evaluation test on a catalyst as another embodiment of the invention and a catalyst not in accordance with the invention.

On the catalysts of Examples 1 and Reference 1, the above described evaluation test was further made by varying the catalyst bed temperature at which the concentration of $H_2$ in the sampled gas was measured over the range from 280° to 360° C. The results are shown in FIG. 2. The catalysts of Example 3 and Reference 3 were also tested in the same manner to obtain the results shown in FIG. 3.

With respect to the catalysts of Example 1 and Reference 1, the experimental data shown in Table 1 and FIG. 2 demonstrate that a catalyst according to the invention is remarkably higher in the activity and selectivity for the decomposition of methanol to hydrogen and carbon monoxide, and also in durability, than typical conventional catalysts for the same use. The catalysts of References 2 and 3 were fairly high in both initial activity and durability owing to the coexistence of a rare earth metal oxide with the metals of the platinum group. However, from a comparison between the experimental data for these two catalysts and the experimental data for the catalysts of Examples 2-4 contained in Table 1 and FIGS. 2 and 3, it is apparent that the reduction treatment in the process according to the invention has the effect of further enhancing both the initial activity and durability of the catalysts.

EXAMPLE 5

The process of Example 3 was repeated generally similarly except that 20.5 g of praeseodymium nitrate $Pr(NO_3)_3.6H_2O$ was used in place of 21.3 g of lanthanum nitrate in Example 3 and that the quantities of chloroplatinic acid and palladium chloride were slightly decreased and increased, respectively.

The catalysts of Example 5 contained such an amount of praseodymium oxide $Pr_2O_3$ that Pr amounted to 1% by weight of the carrier, 0.33% by weight of Pt and 0.07% by weight of Pd.

REFERENCE 4

A catalyst was prepared by performing the process of Example 5 till the baking step for the deposition of platinum and palladium and omitting the reduction treatment in the SBH solution. This catalyst contained 1% by weight of Pr, 0.33% by weight of Pt and 0.07% by weight of Pd.

REFERENCE 5

A catalyst was prepared by first depositing platinum and palladium on the granular carrier used in the foregoing examples by performing the impregnation of the carrier with the sulfurized mixed solution and the subsequent baking of the treated carrier in accordance with Example 5, but without preceded by the deposition of praseodymium oxide on the carrier, and then treating the baked catalyst carrier with 0.1% aqueous solution of SBH in the same manner as in Example 5.

This catalyst contained 0.33% by weight of Pt and 0.07% by weight of Pd.

EXAMPLE 6

A catalyst was prepared generally in accordance with Example 5 but by using 1.0 Wt% aqueous solution of hydrazine for the reduction treatment. This catalyst contained 1% by weight of Pr (existing as oxide), 0.33% by weight of Pt and 0.07% by weight of Pd.

EXAMPLE 7

The process of Example 5 was repeated generally similarly except that 15.1 g of neodymium nitrate $Nd(NO_3)_3$ was used in place of 20.5 g of praseodymium nitrate in Example 5.

The catalyst of Example 7 contained such an amount of neodymium oxide that Nd amounted to 1% by weight of the carrier, 0.33% by weight of Pt and 0.07% by weight of Pd.

REFERENCE 6

A catalyst was prepared by performing the process of Example 7 till the baking step for the deposition of platinum and palladium and omitting the reduction treatment in the SBH solution. This catalyst contained 1% by weight of Nd, 0.33% of Pt and 0.07% of Pd.

EXAMPLE 8

The process of Example 2 was repeated generally similarly except that 28.0 g of yttrium nitrate $Y(NO_3)_3.6H_2O$ was used in place of 21.0 g of cerium nitrate in Example 2 and that 0.1 Wt% aqueous solution of SBH was used for the reduction treatment in place of the hydrazine solution in Example 2.

The catalyst of Example 8 contained such an amount of yttrium oxide that Y amounted to 1% by weight of the carrier, 0.37% by weight of Pt and 0.03% by weight of Pd.

REFERENCE 7

A catalyst was prepared by performing the process of Example 8 till the baking step for the deposition of platinum and palladium and omitting the reduction treatment in the SBH solution. This catalyst contained 1% by weight of Y, 0.37% by weight of Pt and 0.03% by weight of Pd.

EXAMPLE 9

The process of Example 8 was repeated generally similarly except that 31.3 g of titanium sulfate $Ti(SO_4)_2$ was used in place of 28.0 g of yttrium nitrate in Example 8 and that 0.5 Wt% aqueous solution of hydrazine was used for the reduction treatment instead of the SBH solution in Example 8.

The catalyst of Example 9 contained such an amount of titanium oxide that Ti amounted to 1% by weight of the carrier, 0.37% by weight of Pt and 0.03% by weight of Pd.

REFERENCE 8

A catalyst was prepared by performing the process of Example 9 till the baking step for the deposition of platinum and palladium and omitting the reduction treatment in the hydrazine solution. This catalyst contained 1% by weight of Ti, 0.37% by weight of Pt and 0.03% by weight of Pd.

Table 2 shows the results of the hereinbefore described evaluation test on the catalysts of Examples 5-9 and References 4-8.

TABLE 2

| Catalyst | Deposited Metal Oxide | Catalytic Metal (Wt %) | Reducing Agent | Concentration of $H_2$ in Sampled Gas (%) | |
|---|---|---|---|---|---|
| | | | | initially | after 200 hr |
| Ex. 5 | $Pr_2O_3$ | Pt 0.33 Pd 0.07 | SBH | 52 | 49 |
| Ref. 4 | $Pr_2O_3$ | Pt 0.33 Pd 0.07 | — | 49 | 47 |
| Ref. 5 | — | Pt 0.33 Pd 0.07 | SBH | 44 | 37 |
| Ex. 6 | $Pr_2O_3$ | Pt 0.33 Pd 0.07 | $N_2H_4$ | 52 | 48 |
| Ex. 7 | $Nd_2O_3$ | Pt 0.33 Pd 0.07 | SBH | 49 | 47 |
| Ref. 6 | $Nd_2O_3$ | Pt 0.33 Pd 0.07 | — | 48 | 45 |
| Ex. 8 | $Y_2O_3$ | Pt 0.37 Pd 0.03 | SBH | 50 | 48 |
| Ref. 7 | $Y_2O_3$ | Pt 0.37 Pd 0.03 | — | 48 | 46 |
| Ex. 9 | $TiO_2$ | Pt 0.37 Pd 0.03 | $N_2H_4$ | 47 | 44 |
| Ref. 8 | $TiO_2$ | Pt 0.37 Pd 0.03 | — | 45 | 42 |

With respect to the catalysts of Example 5 and Reference 5, the experimental data shown in Table 2 again demonstrate that a catalyst according to the invention is remarkably high in both the activity and durability than conventional catalysts using the same metals of the platinum group. From a comparison between the experimental data for the catalysts of References 4 and 7-8 and the experimental data for the catalysts of Examples 5 (or 6) and 7-9, it is understood that the reduction treatment after the deposition of the catalytic metals on the carrier is always effective for enhancement of the activity and durability of the catalysts.

What is claimed is:

1. A process of preparing a catalyst for reforming a methanol to hydrogen and carbon monoxide, the process comprising the steps of:
    (a) depositing at least one metal oxide which is an oxide of a metal selected from the group consisting of Ce, La, Pr, Nd and Y on a carrier which comprises active alumina over at least substantially the entire surface thereof;
    (b) impregnating the carrier treated at step (a) with an aqueous solution comprising ammonium thiosulfate and at least one thermally decomposable compound of a catalytic metal of the platinum group;
    (c) after step (b), drying the carrier so as to reduce moisture content therein to a predetermined level;
    (d) baking the carrier impregnated with said solution in a steam atmosphere at a temperature between about 500° C. and about 600° C. to decompose said thermally decomposable compound adhering to the carrier to thereby deposit at least one catalytic metal of the platinum group on the carrier; and
    (e) subjecting the carrier treated at step (d) to a reduction treatment which comprises immersing the carrier in a solution of a reducing agent, such that said catalytic metal deposited on the carrier is rendered substantially completely reduced.

2. A process according to claim 1, wherein the concentration of said reducing agent in said solution for the treatment at the step (e) is not higher than 5% by weight.

3. A process according to claim 1 wherein said reducing agent is sodium boron hydride, the concentration of said reducing agent in said solution for the treatment at the step (e) is in the range from 0.01 to 5% by weight.

4. A process according to claim 1, wherein said reducing agent is hydrazine, the concentration of said reducing agent in said solution for the treatment at the step (e) is in the range from 0.1 to 5% by weight.

5. A process according to claim 1, wherein step (a) is performed such that the total amount of the metal of said metal oxide comprises 0.1 to 10% by weight of the carrier and the step (b) is performed such that the total content of said at least one catalytic metal in the catalyst becomes 0.1 to 1.0% by weight.

6. A process according to claim 5, wherein the catalytic metal of said thermally decomposable compound in the step (b) is selected from the group consisting of Pt, Rh and Pd.

7. A process according to claim 6, wherein said thermally decomposable compound in the step (b) is selected from the group consisting of chloroplatinic acid, rhodium trichloride and palladium dichloride.

8. A process according to claim 5, wherein step (a) comprises the sub-steps of (i) impregnating the carrier with an aqueous solution of at least one salt of a metal selected from the group consisting of the Ce, La, Pr, Nd and Y, and (ii) baking the carrier impregnated with said solution in sub-step (i) to decompose said salt adhering to the carrier to thereby form said metal oxide.

9. A process according to claim 8, wherein said salt is selected from the group consisting of nitrate and sulfate.

10. A process according to claim 1, wherein said carrier is granular.

11. A process according to claim 1, wherein said carrier is monolithic.

* * * * *